United States Patent [19]
Stephany et al.

[11] Patent Number: 5,606,206
[45] Date of Patent: Feb. 25, 1997

[54] DEVICE FOR DETECTING THE POSITION OF AN OPTICAL OR MAGNETIC HEAD USED ON LINEAR MOTORS

[75] Inventors: Thomas M. Stephany, Churchville; Edward P. Furlani, Lancaster, both of N.Y.

[73] Assignee: Eastman Kodak Company, Rochester, N.Y.

[21] Appl. No.: 419,341

[22] Filed: Apr. 10, 1995

[51] Int. Cl.$^6$ .......................... H02K 41/02; H02K 41/00
[52] U.S. Cl. ........................ 310/13; 310/12; 318/135; 360/135; 399/211
[58] Field of Search .................................. 310/13, 12, 14; 318/135; 360/77.05, 77.06, 77.08, 77.07, 77.11, 77.14; 369/44.25; 355/235

[56] References Cited

U.S. PATENT DOCUMENTS

| | | | |
|---|---|---|---|
| 5,087,844 | 2/1992 | Takedomi et al. | 310/12 |
| 5,289,088 | 2/1994 | Andoh | 318/135 |
| 5,341,053 | 8/1994 | Yamazaki et al. | 310/13 |
| 5,388,086 | 2/1995 | Yamasaki et al. | 369/44.14 |
| 5,453,684 | 9/1995 | Nakayama | 324/207.12 |
| 5,536,983 | 7/1996 | Araki et al. | 310/12 |

*Primary Examiner*—Steven L. Stephan
*Assistant Examiner*—Tran Nguyen
*Attorney, Agent, or Firm*—Peyton C. Watkins

[57] ABSTRACT

In one embodiment, a device for detecting the position of a head attached to a linear motor, the detection device comprises an extension member for guiding and directing flux therein. A moving coil disposed on the extension member which coil, when energized, moves along the extension for positioning the head. A magnet positioned in a spaced apart relationship with the coil for inducing a drive flux which assists in imparting the motion to the coil when the coil is energized. A first wall is positioned adjacent the linear motor. A second wall is positioned in a spaced apart relationship with the first wall. A first and second magnet both include a north and south pole oriented along their cross-sectional dimension for generating a magnetic field substantially between the first and second walls; wherein the south pole of the first magnet is in abutting contact with the first wall and the north pole of the second magnet is in abutting contact with the first wall; wherein the north pole of the first magnet is in abutting contact with the second wall and the south pole of the second magnet is in abutting contact with the second wall. A sensor is attached to and moving in unison with the coil and positioned between the first and second walls for detecting the magnetic flux between the walls for ultimately determining the position of the magnetic head.

7 Claims, 3 Drawing Sheets

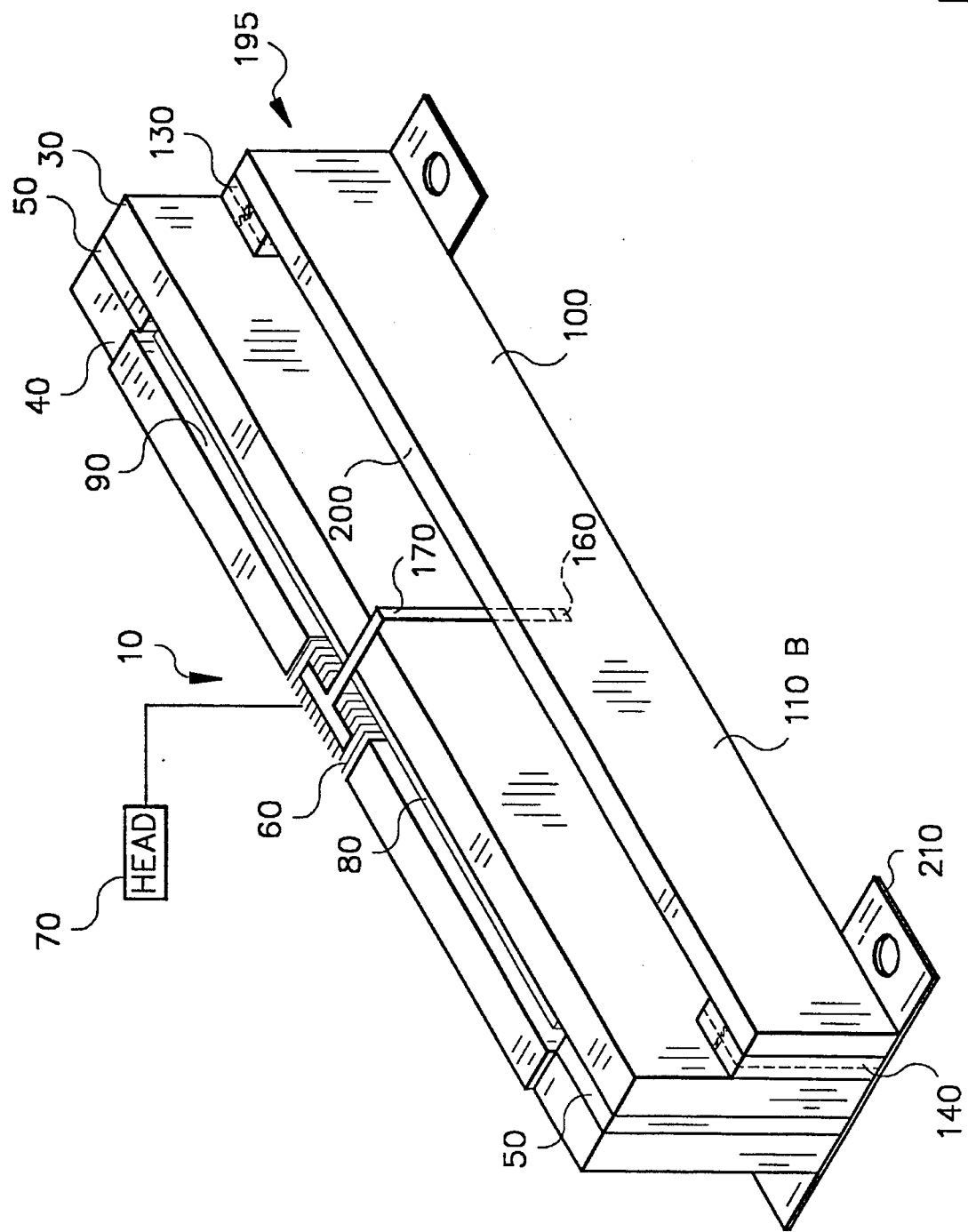

DEVICE FOR DETECTING THE POSITION OF AN OPTICAL OR MAGNETIC HEAD USED ON LINEAR MOTORS

BACKGROUND OF THE INVENTION

CROSS-REFERENCE TO RELATED APPLICATIONS

The present invention is related to U.S. Application Ser. No. 398,023, entitled "AN IMPROVED LINEAR MOTOR HAVING TUNING COILS," filed Mar. 3, 1995 by Thomas M. Stephany, William Mey and Edward P. Furlani; and U.S. application Ser. No. 404,386, entitled "A LINEAR MOTOR HAVING A CONTOURED CORE," filed Mar. 14, 1995 by Edward P. Furlani, Thomas M. Stephany and William Mey.

FIELD OF INVENTION

The present invention relates generally to linear motors and, more particularly, to a device for detecting the position of an optical or magnetic head used on linear motors.

BACKGROUND OF THE RELATED ART

Linear actuators or linear motors are typically used for radial positioning of optical or magnetic heads in disk drive applications where smooth and rapid motion of the optical or magnetic head is required. Optical or magnetic heads, as defined hereinafter, include components such as lens, tracking actuator, magnetic write/read head and devices of similar functions and is herewith collectively referred to as a head. The heads are used to perform reading operations which are well known in the art. These motors use either moving magnets or moving coils to provide the necessary movement of the head. The linear motor described hereinbelow utilizes the moving coil approach.

The moving coil type linear motor includes a rectangular shaped core having an extension at its top portion, a foundation at its bottom portion and two side portions respectively connecting the foundation and extension portion. The linear motor provides fast and smooth motion by having a coil wound around the extensions in such a way that a significant part of each of its turns is exposed to a uniform magnetic field which is produced by a permanent magnetic resting on the foundation. When a current flows through the coil a force, referred to in the art as a Lorentz force, is exerted on the coil causing it to accelerate in proportion to the amount of current flowing in the coil. The coil which is wrapped around the extension moves along the extension parallel to the stationary permanent magnet. The moving coil is connected to a movable head which, as stated above, contains the optics and other devices required in a functional disk drive.

To improve the temporal response of the motor, a "shorted turn," consisting of a copper sleeve is inserted between the extension and the moving coil.

Since it is critically important for an actuator system to move a head very rapidly between data locations and do so with high positional accuracy between closely-spaced track addresses, this constraint becomes ever more burdensome as track density increases. Fast access allows a computer to process data as fast as possible because computer time is so expensive that any significant delay over an extended period can inflate costs enormously. Transition time, during which heads are moved from track to track, is "dead time" insofar as data processing is concerned, and is undesirable.

The trend now is toward ever higher track density, with increased storage capacity and decreased access time. Of course, as track density rises, closer control over the actuator mechanism is necessary to position heads accurately over any selected track, lest signals be recorded or read with too much distortion or without proper amplitude control.

The prior art discloses many such positioner devices, including some intended for use in magnetic disk memory systems; e.g. see U.S. Pat. Nos. 3,113,880; 3,314,057; 3,619,673; 3,922,720; 4,001,889; 3,544,980; 3,646,536; 3,665,443; 3,666,977; 3,827,081; 3,922,718 and 5,206,555. These prior art devices disclose means for positioning a head; however, they lack accurate monitoring of the position of the head and providing a feedback signal after such monitoring for minor adjustment of the position of the head.

Although these positioner devices described above are satisfactory, they are not without drawbacks. The presently known and utilized systems do not provide a means for monitoring the position of a head or a means for providing feedback signals to the head after this monitoring for minor position adjustments. In addition, they are complex and costly to manufacture.

Consequently, a need exists for an improved device that provides precise position monitoring of the head and a feedback signal to head after this monitoring for minor position adjustments.

SUMMARY OF THE INVENTION

It is an object of the present invention to provide a position indicator which provides precise monitoring of the position of a head used on linear motors.

It is also a feature of the present invention to provide a feedback signal to the head after the aforementioned position monitoring for position adjustments, if needed, to the head position.

It is a feature of the present invention to provide a sensor attached to and moving in unison with a coil and positioned between first and second walls for detecting the magnetic flux between the walls for determining the position of the magnetic head.

With this object in view, the present invention resides in a device for detecting the position of a head attached to a linear motor, the detection device comprises (a) an extension member for guiding and directing flux therein; (b) a moving coil disposed on said extension member which said coil, when energized, moves along said extension for positioning the head; (c) a magnet positioned on said core and in a spaced apart relationship with said moving coil for inducing a drive flux which assists in imparting the motion to said coil when said moving coil is energized; (d) a first wall; (e) a second wall in a spaced apart relationship with said first wall; (f) a first and second magnet both having a north and south pole oriented along their cross-sectional dimension for generating a magnetic field substantially between said first and second walls; wherein the south pole of the first magnet is in abutting contact with said first wall and the north pole of the second magnet is in abutting contact with said first wall; wherein the north pole of the first magnet is in abutting contact with said second wall and the south pole of the second magnet is in abutting contact with said second wall; (g) a sensor attached to and moving in unison with said coil and positioned between said first and second walls for detecting the magnetic flux between said walls for ultimately determining the position of the magnetic head.

The above and other objects of the present invention will become more apparent when taken in conjunction with the following description and drawings wherein like characters indicate like parts and which drawings form a part of the present invention.

BRIEF DESCRIPTION OF THE DRAWINGS

In the course of the following detailed description, reference will be made to the attached drawings in which:

FIG. 3 is an alternative embodiment of FIG. 1.

DETAILED DESCRIPTION OF THE INVENTION

Figure 1:
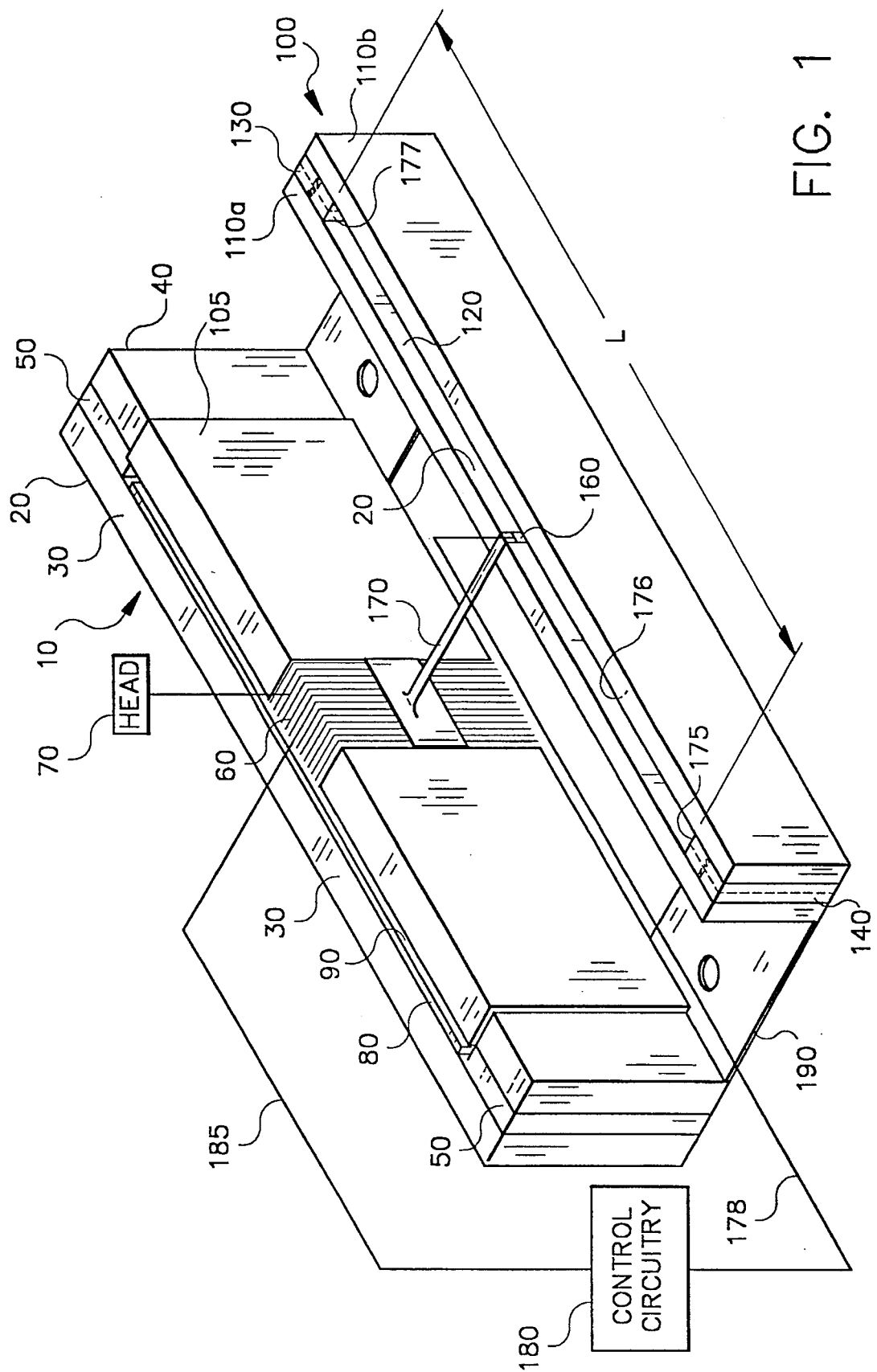
FIG. 1 is a perspective view of a linear motor and its position sensor device of the present invention.

Referring to FIG. 1, there is illustrated a moving-coil type linear motor 10. The linear motor 10 includes a rectangular shaped core 20 having a foundation 30, a top extension 40 in a spaced apart relationship and parallel relationship with the foundation 30, and two legs 50 for respectively attaching the extension 40 and the foundation for forming a closed loop core. A moving coil 60 is positioned on the top extension 40 for moving an attached head 70 which performs well known functions in optical disk drive applications. When a current flows through the coil 60 a force, referred to in the art as a Lorentz force, is exerted on the coil causing it to accelerate in proportion to the amount of current flowing in the coil along the top extension 40. A permanent magnet 80 rests on the foundation 30 for inducing a magnetic field in an air gap 90 of the core 20. The top extension 40 is made of a soft magnetic material such as cold-rolled steel, and is dimensioned to utilize the magnetic flux from the permanent magnet 80 as well as to allow the maximum desired travel length.

To improve the temporal response of the motor 10, a shorted turn 105, typically a copper sleeve, is inserted between the extension 40 and the moving coil 60.

A positioning device 100 is disposed adjacent the linear motor 10 and includes two walls 110a and 110b, which are made from magnetic material such as cold-rolled steel, in a spaced apart, generally parallel relationship with each other for forming an air gap 120 therebetween. The air gap 120 includes a length (L) which corresponds to the entire length that the coil moves along the top extension 40, and which, in turn, translates to the position of the head. Two magnets 130 and 140 are respectively positioned between the ends of the two walls 110a and 110b for inducing a magnetic flux in the air gap 120. Magnet 130 is oriented so that its south pole abuts wall 110a and its north pole abuts wall 110b. Conversely, magnet 140 is oriented so that its north pole abuts wall 110a and its south pole abuts wall 110b. A sensor 160, many of which are well known in the art such as a Hall effect sensor or a magneto-resistive sensor, is attached via a mounting bracket 170 to the moving coil 60 for sensing the magnetic flux in the air gap 120.

Figure 2:
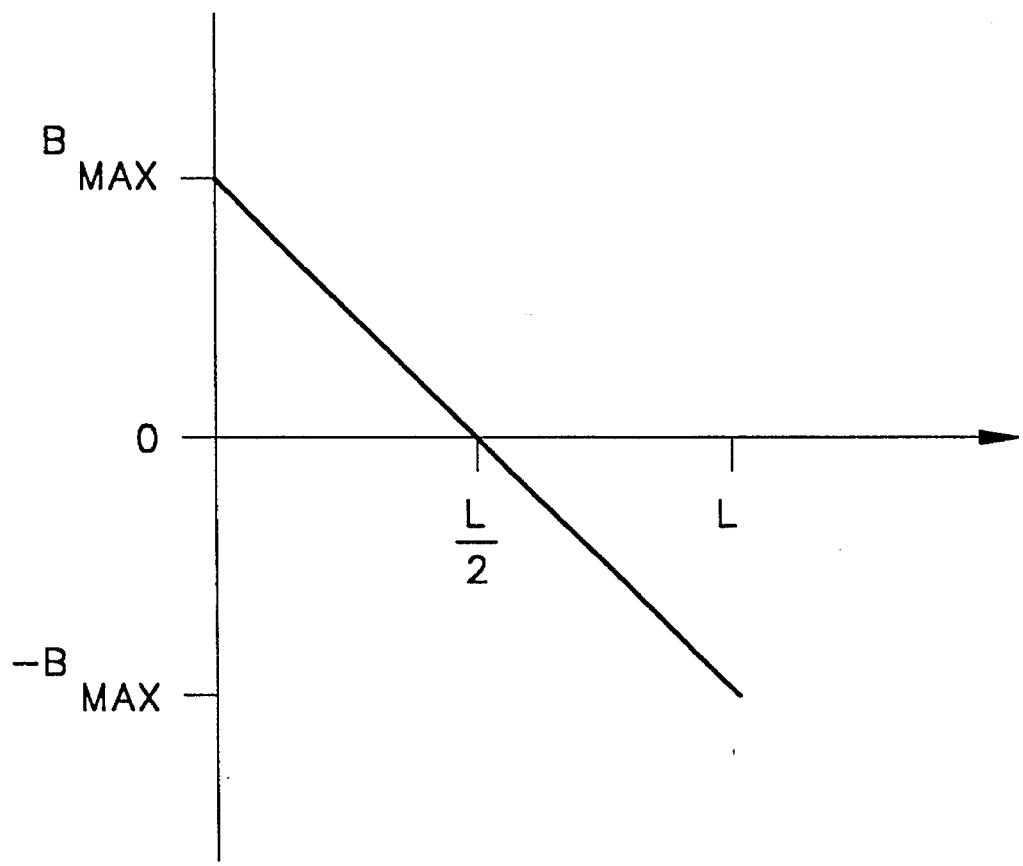
FIG. 2 is a graph illustrating the magnetic field versus position in the sensor device.

Referring to FIG. 2 and the air gap 120 of FIG. 1, the vertical field component in air gap 120 takes on a maximum positive value at one end of gap 120, for example at end 175 of the air gap 120, decreases linearly along the air gap 120, takes on the value of zero at a midway point 176 along the air gap 120, and obtains a maximum negative value at the opposite end 177 of the air gap 120. Thus, the field is a linear function of position and as the sensor 160 moves in the air gap 120 its output (voltage in the preferred embodiment) will also be a linear function of position. Referring back to FIG. 1, the output of sensor 160 is electrically transmitted via a cable 178 to control circuitry 180, which is well known in the art, for processing the output. The control circuitry 180, in turn, controls a feedback current transmitted via a cable 185 to coil 60 for controlling its motion in response to the monitored positioned for precisely positioning the head at its predetermined, desired location.

For convenience, a bottom plate 190 is attached to both the linear motor 100 and the positioning device 100 for rigidly attaching them together.

Referring to FIG. 3, a positioning device 195 is shown for illustrating an alternative embodiment of the present invention. Similar to the preferred embodiment, the linear motor 10 includes a foundation 30, top extension 30, legs 50, coil 60, head 70, magnet 80, and air gap 90. However, an air gap 200 is formed by the foundation 30, the wall 100b and the magnets 130 and 140 positioned respectively between their ends. The air gap 200 performs the same function as the air gap 120 of the preferred embodiment. The sensor 160 is positioned in the air gap 200 via the bracket 170 attached to the coil 60. The sensor 160 is attached to control circuitry (not shown in FIG. 3 for the purpose of clarity) as in the preferred embodiment for receiving the output from the sensor 160 and providing feedback signals to the coil 60.

Also for convenience, a plate 210 may be attached to the linear motor 10 and positioning device 195 for rigidly attaching them together.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

| Parts List: | |
|---|---|
| 10 | linear motor |
| 20 | core |
| 30 | foundation |
| 40 | extension |
| 50 | leg |
| 60 | moving coil |
| 70 | head |
| 80 | magnet |
| 90 | gap |
| 100 | positioning device |
| 105 | shorted turn |
| 100b | wall |
| 110a | wall |
| 110b | wall |
| 120 | air gap |
| 130 | magnet |
| 140 | magnet |
| 160 | sensor |
| 170 | bracket |
| 175 | end |
| 176 | midway point |
| 177 | opposite end |
| 178 | cable |
| 180 | circuitry |
| 185 | cable |
| 190 | bottom plate |
| 195 | positioning device |
| 200 | air gap |
| 210 | plate |

We claim:

1. A device for detecting the position of a head attached to a linear motor, the detection device comprising:

(a) an extension member for guiding and directing flux therein;

(b) a moving coil disposed on said extension member which said coil, when energized, moves along said extension member for positioning the head;

(c) a magnet positioned in a spaced apart relationship with said moving coil for inducing a drive flux which assists in imparting the motion to said coil when said moving coil is energized;

(d) a first wall;

(e) a second wall in a spaced apart relationship with said first wall;

(f) a first and second magnet both having a north and south pole oriented along their cross-sectional dimension for generating a magnetic field substantially between said first and second walls; wherein the south pole of the first magnet is in abutting contact with said first wall and the north pole of the second magnet is in abutting contact with said first wall; wherein the north pole of the first magnet is in abutting contact with said second wall and the south pole of the second magnet is in abutting contact with said second wall; and (g) a sensor attached to and moving in unison with said coil and positioned between said first and second walls for detecting the magnetic flux between said walls for ultimately determining the position of the magnetic head.

2. The device as in claim 1, wherein said first wall is a foundation of the linear motor.

3. The device as in claim 1 further comprising control circuitry for receiving output from the said sensor and for providing a feedback signal to said coil for providing position adjustments to the head.

4. The device as in claim 1, wherein said first and second magnets are permanent magnets.

5. The device as in claim 4 further comprising a plate attached to both said second wall and the linear motor for rigidly attaching them together.

6. The device as in claim 4, wherein said sensor is a Hall effect sensor.

7. The device as in claim 4, wherein said sensor is a magneto-resistive sensor.

* * * * *